United States Patent
Alptekin et al.

(10) Patent No.: US 11,786,859 B2
(45) Date of Patent: Oct. 17, 2023

(54) AIR SEPARATION SORBENT AND VACUUM ASSISTED PRESSURE SWING ADSORPTION PROCESS USING THE SAME

(71) Applicant: TDA Research, Inc, Wheat Ridge, CO (US)

(72) Inventors: Gökhan O. Alptekin, Boulder, CO (US); Douwe Bruinsma, Louisville, CO (US); Ambalavanan Jayaraman, Highlands Ranch, CO (US); Brandon Gushlaw, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 17/168,147

(22) Filed: Feb. 4, 2021

(65) Prior Publication Data
US 2021/0236982 A1 Aug. 5, 2021

Related U.S. Application Data

(60) Provisional application No. 62/969,977, filed on Feb. 4, 2020.

(51) Int. Cl.
*B01D 53/04* (2006.01)
*B01D 53/047* (2006.01)

(52) U.S. Cl.
CPC ..... *B01D 53/0476* (2013.01); *B01D 53/0407* (2013.01); *B01D 2253/304* (2013.01); *B01D 2256/12* (2013.01); *B01D 2257/104* (2013.01); *B01D 2259/402* (2013.01); *B01D 2259/4533* (2013.01)

(58) Field of Classification Search
CPC ........... B01D 53/0476; B01D 53/0407; B01D 2253/304; B01D 2256/12; B01D 2257/104; B01D 2259/402; B01D 2259/4533; B01D 2253/108; B01D 2257/102; B01D 2259/4145
See application file for complete search history.

(56) References Cited

FOREIGN PATENT DOCUMENTS

WO    WO-0025885 A1 *   5/2000   ......... B01D 15/1828
WO    WO-2009101282 A1 *   8/2009   ......... B01D 15/1842

* cited by examiner

*Primary Examiner* — Joseph J Dallo
(74) *Attorney, Agent, or Firm* — Brian J. Elliott (57) ABSTRACT

A vacuum assisted pressure swing adsorption device for purifying oxygen from air, comprising: a first adsorption bed of LiLSX adsorbent and second adsorption bed of AgLiLSX adsorbent, wherein the first adsorption bed and the second adsorption bed are connected to each other in series. A method for producing medical oxygen using a vacuum assisted pressure swing adsorption device comprising: a first adsorption bed of LiLSX adsorbent and second adsorption bed of AgLiLSX adsorbent, wherein the first adsorption bed and the second adsorption bed are connected to each other in series.

6 Claims, 12 Drawing Sheets

| Reactor 1 | Feed (1) | Equalization (2) | Blowdown (3) | Desorption (4) | Equalization (5) | Re-pressurization (6) |
| Reactor 2 | Desorption (4) | Equalization (5) | Re-pressurization (6) | Feed (1) | Equalization (2) | Blowdown (3) |

AIR SEPARATION SORBENT AND VACUUM ASSISTED PRESSURE SWING ADSORPTION PROCESS USING THE SAME

STATEMENT REGARDING FEDERALLY SPONSORED RESEARCH OR DEVELOPMENT

This invention was made using U.S. government funding through the United States Marine Corps, SBIR Phase II Contract No. M67854-16-C-6504 and SBIR Phase III Contract No. M6785419C5139. The government has certain rights in this invention.

FIELD OF THE INVENTION

The present invention relates generally to pressure swing adoption for producing concentrated oxygen.

BACKGROUND OF THE INVENTION

Existing Portable Oxygen Generation (POG) systems use pressure swing adsorption (PSA), in which the air is pressurized to roughly to 4 atm and then N2 is selectively adsorbed onto a zeolite-based adsorbent media and removed from the air, producing a concentrated oxygen stream. However, the compression of air is a highly energy intensive process. As the high pressure nitrogen gas that adsorbed onto the sorbent bed is released at or near ambient pressure (to regenerate the sorbent), most of the energy put into the compression process is lost (N2 constitutes 79% of the air and all the energy input provided to compressing N2 will be lost at the low temperature regeneration step). Hence, air separation units that are based on N2-selective sorbents are relatively inefficient and their energy consumption per unit volume of oxygen produced is very high.

The advanced oxygen generators use a vacuum assisted pressure swing adsorption (VPSA) process for separating the oxygen from air. These types of processes are commercially used in stationary adsorption based air separation plants and also now beginning to be employed in the portable oxygen systems. These VPSA based processes typically use lithium exchanged type X (LiX) or low silica type X (LiLSX) zeolite adsorbents.

In the separation of air, zeolites of type A and X have typically been used (U.S. Pat. No. 5,551,257) and have 4.9 to 7.9 mol/kg cation exchange capacity. The extra framework charge balancing cations are largely responsible for the nitrogen selectivity observed in these zeolites. These zeolites preferentially adsorb nitrogen over oxygen in the ratio of 4:1 due to interactions between the charge balancing cations and the quadruple moment of the adsorbate (N2 or O2). Li+ cations provides the strongest interactions and the highest N2 adsorption capacity and selectivity and is now used widely in commercial air separation units.

U.S. Pat. No. 4,859,217 (Chao) teaches that Li+ exchange in the type X zeolite must exceed 70% threshold before the Li+ has any effect on the adsorption properties of N2. Also, a significant increase in N2 adsorption capacity was seen in Li+ exchanged low silica type X zeolite over that of the regular type X zeolite (which has a Si/Al ratio of 1.25). LiLSX (Si/Al ratio of 1.0) is used for VPSA based air separation process (U.S. Pat. No. 5,286,023, Kirner; U.S. Pat. No. 5,554,208 Mullhaupt).

Binary exchanged X zeolites with Li+ in combination with alkaline earth metal cations (such as Ca2+ and Sr2+) have also been reported (U.S. Pat. No. 4,557,736, Sircar et al.; U.S. Pat. No. 4,481,018 Coe et al.). More recently, Yang and Hutson (2004) in the U.S. Pat. No. 6,780,806 claimed the use of LixAgyX zeolite where silver is in +1 valence state and is dispersed in clusters and wherein x is greater than y and x+y is less than or equal to the cation exchange capacity of the zeolite. They also demonstrated that the presence of silver or copper cations in the exchange sites improves the strength of nitrogen adsorption. Since the Ag+ and Cu+ cations strongly hold nitrogen, they teach the use of 20% silver/copper exchanged zeolites to be optimal for air separation.

U.S. Pat. No. 6,432,170 (Chiang et al.) describes the use of AgLiLSX zeolite having a silver exchange level of 20-70% with an Ar/O2 Henry's law selectivity of 1.05 in VSA or VPSA-based air separation processes to produce oxygen at purities above 97%. U.S. Pat. No. 6,544,318 (Dee et al.) describes a pressure swing adsorption process that uses a layered bed of Ag exchanged LiLSX zeolite and LiLSX zeolite for the recovery of high purity oxygen (greater than 97 vol %) where in the volume occupied by the second adsorption zone is greater than 35% by vol. Dee et al. teaches that adding a second layer of AgLiLSX to a bed of LiLSX results in reduced performance for producing oxygen at purities less than or equal to 96% by vol. (see FIG. 2, where all examples of using the AgLiLSX in combination with LiLSX have lower recovery %). Thus, Dee et al. teaches away from any understanding that a bed of AgLiLSX could be used in combination with a bed of LiLSX to improve the overall performance of the oxygen recovery relative to a single bed of LiLSX with no AgLiLSX bed for producing oxygen at purities less than or equal to 96% by volume.

However, the cost of air separation still remains high due to the fact that while the AgLiLSX achieves a high capacity at low N2 concentrations, they do not match the performance of the regular LiLSX zeolites at high pressures (ambient and higher). Therefore, there is a need for improved methods and materials to efficiently separate nitrogen from air to produce oxygen.

SUMMARY OF THE INVENTION

The present invention solves the limitations of the prior art by providing a vacuum assisted pressure swing adsorption process for producing oxygen with higher performance, greater efficiency, and lower energy consumption compared to systems taught in the prior art that use LiLSX, AgLiLSX or combinations thereof. The present invention teaches a critical range for the relative volume of a LiLSX bed and an AgLiLSX bed, which are used in combination in an oxygen recovery process that has improved performance over the prior art for oxygen produced at purity less than 95% by volume, and which is surprising and contrary to the teaching of the prior art. In an alternative, the present invention teaches a critical range for the relative mass of a LiLSX bed and an AgLiLSX bed, which are used in combination in an oxygen recovery process that has improved performance over the prior art for oxygen produced at purity less than 95% by volume, and which is surprising and contrary to the teaching of the prior art.

The invention provides an adsorption device and methods of using it, wherein the adsorption device comprises two adsorbent beds in series: (Bed 1) lithium exchanged X zeolite with Si/Al ratio of 1.0 to 10.0 having an ion exchange composition of LixMyX where x>y and M represents one or more alkaline earth metal cations, and (Bed 2) silver exchanged X zeolites with Si/Al ratio of 1.0 to 1.25, preferably silver exchanged lithium X zeolite having an ion exchange composition of the form $Ag_xLi_yM_zX$ where $x+y>0.85$, $x>0.2$, and $z<0.15$. Bed 2, the silver exchanged zeolites is positioned at the distal end of the bed (The end of the bed from which the high purity oxygen product is withdrawn). This distal end also contains the low concentration (also low partial pressure) nitrogen in the gas phase hence the sorbent used in the distal end needs to have high nitrogen capacity at low partial pressures which is provided by the silver exchanged X zeolites. However, the adsorbed nitrogen has to be subsequently released during the desorption step so that the bed can again be used to remove nitrogen from air on the next adsorption step. The placement of the silver exchanged X zeolite bed at the distal end of the bed where the high purity oxygen product purge occurs (where the nitrogen partial pressure is very low at the end of the desorption step). The use of the provided two-bed critical configuration allows for significantly increased overall nitrogen adsorption capacity. It also provides the critical selectivity to nitrogen over oxygen even in the area of the bed where gas phase nitrogen concentration during adsorption step is low (less than 40%).

A critical embodiment of the present invention is the ratio of the sizes of the two beds. The AgLiLSX bed must be less than 50% of the total bed volume, more preferably less than 30% (for the combination of AgLiLSX and LiLSX). In an optional embodiment the present invention also teaches that the desorption pressure is no more than 8 psia, preferably less than 6 psia. In another embodiment of the present invention it also teaches that the overall bed length to diameter (length over diameter) ratio is no more than 1.8 preferably less than 1.3.

The present invention also teaches the proper configuration of two beds as separate beds, or as separate layers in the same bed vessel, operably connected to each other in series. In an embodiment the invention provides a first bed containing LiLSX and a second bed containing AgLiLSX, wherein the first bed and second bed are connected in series. Preferably the AgLiLSX bed is located at the distal end of the adsorption bed.

In optional embodiments the AgLiLSX bed is at least 1.0%, 1.5%, 2.0%, 2.5%, 5%, 7.5%, 10%, 12.5%, 15%, 17.5%, 20%, 22.5%, 25%, 27.5%, 30%, 35%, 40% or 45% of the total bed volume (for the combination of AgLiLSX and LiLSX). In optional embodiments, the desorption pressure is at least 0.5 psia, 1.0 psia, 1.5 psia, 2.0 psia, 2.5 psia, 3.0 psia, 3.5 psia, 4.0 psia, 4.5 psia, 5.0 psia, 5.5 psia, 6.0 psia, 6.5 psia, 7.0 psia, or 7.5 psia. In other optional embodiments, the overall bed length to diameter ratio is at least 0.1, 0.2, 0.3, 0.4, 0.5, 0.6, 0.7, 0.8, 0.9, 1.0, 1.1, 1.2, 1.3, 1.4, 1.5, 1.6, or 1.7.

In an embodiment, a method of purifying oxygen uses layered beds of Li-exchanged zeolites with a partial silver exchanged X zeolite at a specific volume ratio of less than 50%, preferably less than 30% to reduce the normalized power draw (specific energy for air separation) to produce unit volume of 90+% oxygen from ambient air.

In an embodiment, a method for purifying oxygen or a method for concentration oxygen for medical purposes uses a low L/D ratio beds and/or lower desorption pressure in pressure swing adsorption based air separation particularly to produce 50-95% oxygen, which results in better desorption of adsorbed nitrogen and trace moisture, providing higher product flow and low normalized power draw and longer life (increased moisture tolerance in high humidity ambient air) for the sorbent bed. Lower L/D ratios are no more than 1.8 preferably less than 1.3. Lower desorption pressures are is no more than 8 psia, preferably less than 6 psia. In these methods other optional embodiments are that the AgLiLSX bed is at least 1.0%, 1.5%, 2.0%, 2.5%, 5%, 7.5%, 10%, 12.5%, 15%, 17.5%, 20%, 22.5%, 25%, 27.5%, 30%, 35%, 40% or 45% of the total bed volume (for the combination of AgLiLSX and LiLSX. In optional embodiments, the desorption pressure is at least 0.5 psia, 1.0 psia, 1.5 psia, 2.0 psia, 2.5 psia, 3.0 psia, 3.5 psia, 4.0 psia, 4.5 psia, 5.0 psia, 5.5 psia, 6.0 psia, 6.5 psia, 7.0 psia, or 7.5 psia. In other optional embodiments, the overall bed length to diameter ratio is at least 0.1, 0.2, 0.3, 0.4, 0.5, 0.6, 0.7, 0.8, 0.9, 1.0, 1.1, 1.2, 1.3, 1.4, 1.5, 1.6, or 1.7.

In an embodiment, a method for purifying oxygen or a method for concentration oxygen for medical purposes uses a layered adsorption bed containing two layers wherein the first layer consists of Li exchanged LSX zeolite with Si/Al ratio of 1.0 to 1.25 and the second layer consists of Ag exchanged LiLSX zeolite with Si/Al ratio of 1.0 to 1.25 to produce 50-95% oxygen by volume from ambient air.

In preferred embodiments the volume ratio of LiLSX to Ag-LiLSX beds is less than 50% more preferably less than 30% by volume. In a preferred embodiment, the mass ratio of LiLSX to Ag-LiLSX beds is less than 50% more preferably less than 30% by volume. In other optional embodiments, the volume ratio or the mass ratio of LiLSX to Ag-LiLSX beds is less than 45%, 40%, 35%, 25%, 20%, 15%, 10%, or 5%. In other optional embodiments, the volume ratio or the mass ratio of LiLSX to Ag-LiLSX beds is at least 45%, 40%, 35%, 25%, 20%, 15%, 10%, or 5%.

The preferred pressure ratio is between 3 to 8 (psia/psia) and cycle time between 15 to 40 sec, more preferably a pressure ratio between 5 to 7 (psia/psia) and cycle time between 20-30 sec.

The preferred adsorption pressure is between 18-30 psia and desorption pressure between 1-8 psia, more preferably adsorption pressure between 21-26 psia and desorption pressure between 4-6 psia.

The preferred amount of purge gas to feed gas ratio to be used is between 0 to 0.2, more preferably between 0 to 0.05, optionally at least 0.01, 0.02, 0.03, 0.04, 0.1, 0.15, or optionally at most 0.01, 0.02, 0.03, 0.04, 0.1, 0.15.

In optional methods, beds are used with an overall L/D ratio being less than 1.8 where in the sorbent can be distributed in multiple beds in parallel or use a single bed with a low L/D to achieve a lower desorption pressure and higher product flow resulting in lower normalized power draw and also a higher tolerance to high humidity gas (moisture) providing longer bed life.

In optional methods, the method uses lower desorption pressures, less than 6 psia, to increase the moisture tolerance and operational life of the LiLSX sorbent.

In an embodiment, the method uses a cycle scheme which uses a high pressure adsorption step and a low pressure desorption step, in another embodiment the method uses intermediate pressure equalization and blow down steps, in another embodiment the method uses a purge step at a pressure lower than the adsorption step with the high purity oxygen gas or the gas coming off of the intermediate pressure equalization step.

The present invention provides a vacuum assisted pressure swing adsorption device for purifying oxygen from air, comprising: a first adsorption bed and a second adsorption bed, wherein the first adsorption bed and the second adsorption bed are either separate layers contained in the same adsorption bed vessel, or separate adsorption beds contained in separate adsorption bed vessels that are operably connected to each other in series; wherein, the first bed is located on the proximal end of an adsorption bed train and is operably connected to an air gas feed stream, the second bed is located on the distal end of an adsorption bed train and is operably connected to a purified oxygen exit gas stream; and wherein, the first bed comprises a LiLSX sorbent and a second bed comprises a AgLiLSX sorbent, wherein the first bed and the second bed are connected to each other in series and the AgLiLSX bed is located at the distal end of the adsorption bed.

The present invention provides a method for concentration oxygen for medical purposes using the device of claim 1, comprising: operating the device of claim 1 in a vacuum-assisted pressure swing adsorption process; and, producing a concentrated gas stream comprising 50-95% oxygen.

In certain embodiments the preferred L/D ratio may be based on the overall volume of the bed. For volumes, about 240 mL per bed, the preferred LID may be 3.0. This device may be used in the method to produce oxygen at a rate of 4 LPI O2 production. In other embodiments the L/D ratio is from 3 to 5. In other embodiments the volume of the bed is at least 630 mL and the LID is no more than 1.8. The device with the bed volume of at least 630 mL may be used in a method to produce oxygen at 20 LPM (liters per minute) O2 production, Optionally the bed volume may be 1.4 L or 2.2 L.

DETAILED DESCRIPTION OF THE INVENTION

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

The present invention teaches a vacuum assisted pressure swing adsorption (VPSA) process for producing oxygen at purity greater than 50-95% by vol. from ambient air. Alternatively the feed gas can be any gas mixture containing nitrogen, oxygen and argon. In this embodiment, the concentration of oxygen can be between 10-50% by vol. and the concentration of argon in this feed gas can be between about 1 and 5% by vol. The process uses preferably two adsorption zones in series in the adsorbent bed. The first zone is referred to as Bed 1 and uses LiLSX zeolite as adsorbent and the second zone is referred to as Bed 2 and uses Ag-LiLSX zeolite as adsorbent. To obtain the improved performance, the AgLiLSX bed must be less than 50% of the total bed volume, more preferably less than 35% (for the combination of AgLiLSX and LiLSX). Optionally the desorption pressure should be 8 psia or lower.

The LiLSX sorbent can be produced with known methods and is also commercially available from UOP under the trade name Oxysiv®-MUX. It is also available from other manufacturers such as ZeoChem.

The Ag-LiLSX sorbent is a Air Products patented material, which is a 40% Ag exchanged LiLSX sorbent prepared following the method in U.S. Pat. No. 6,432,170, which is incorporated by reference herein. An example preparation can be found at Example #1, in U.S. Pat. No. 6,432,170 for a 40% Ag exchange level.

Figure 1:
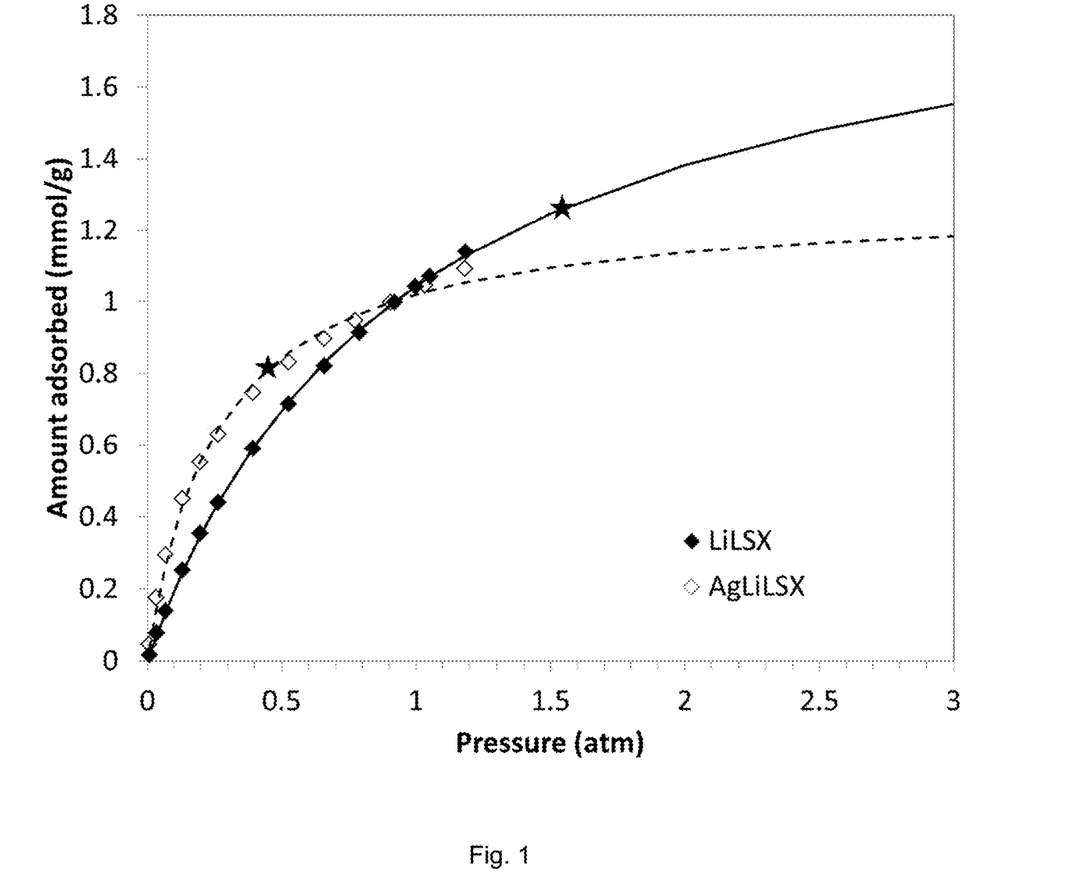
FIG. 1. Adsorption isotherms for N2 on LiLSX and AgLiLSX.

The Ag-LiLSX sorbent has a higher capacity for nitrogen at lower partial pressures than LiLSX zeolite (FIG. 1). The capacity at higher partial pressures, however, is less than the LiLSX sorbent. Although not wishing to be bound by theory, the present invention teaches the use of the layered bed of LiLSX as Bed 1 and the Ag-LiLSX as Bed 2 during adsorption step to make use of the two sorbents at the preferred configuration. The Bed 1 is located in the feed entrance and will see the feed air as it enters where N2 concentration (and partial pressure) is high and as the nitrogen is removed in LiLSX (Bed 1) the gas phase concentration gets lower. Having the Ag-LiLSX downstream allows the present invention to achieve significantly higher loading for N2 when the gas phase concentrations are lower. The ideal placement for the Bed 2 is in the mass transfer zone of the N2 gas phase wave front when the N2 partial pressure in the gas phase gets lower than 0.7 atm. At the exit end of the bed the gas phase N2 concentration is less than 2% and the use of AgLiLSX in second layer significantly enhances the N2 capacity and the selectivity in that portion of the bed bringing the overall N2 capacity and O2 recovery higher. Higher selectivity for N2 results in improved O2 recovery. O2 recovery is defined as the amount of O2 in the feed air that enters the air separation process that ends up in the high purity oxygen product. Higher recovery implies less feed air to be processed i.e., less N2 to be removed and subsequently desorbed resulting in significantly lower energy consumption to accomplish the air separation.

The layered adsorbent beds are typically taken through a vacuum assisted pressure swing adsorption cycle that uses the following steps: 1) feed/high pressure adsorption, 2) reducing pressure equalization, 3) countercurrent blowdown, 4) countercurrent desorption/purge, 5) increasing pressure equalization, and 6) re-pressurization. In the feed/high pressure adsorption step ambient air is compressed and supplied to the sorbent reactor at pressure greater than 18 psia and the sorbent bed removes the nitrogen and produces high purity oxygen (greater than 50%). In the reducing pressure equalization step, the reactor which completed high pressure adsorption step will equalize in pressure with a bed coming off of step (4) the countercurrent desorption/purge step and depressurize to a lower pressure. In the countercurrent blowdown step, the reactor will further decrease in pressure to the desorption pressure less than 8 psia. In the countercurrent desorption/purge step, the adsorbed nitrogen will be desorbed at the desorption pressure less than 8 psia. A slip stream of the high purity oxygen produced in step (1) could be used during the desorption step (4) to further desorb the adsorbed nitrogen. In step (5) increasing pressure equalization step, the reactor which completed purge/desorption step will equalize in pressure with the bed coming off of step (1). In step (6) the reactor coming off of step (5) will be further increased in pressure by using either the high purity oxygen in the countercurrent flow direction to feed gas in step (1) or the feed gas (ambient air) in the co-current direction (same flow direction as the feed gas flow in step (1)). Each of these steps time could be between 0-60 seconds each.

Figure 2:
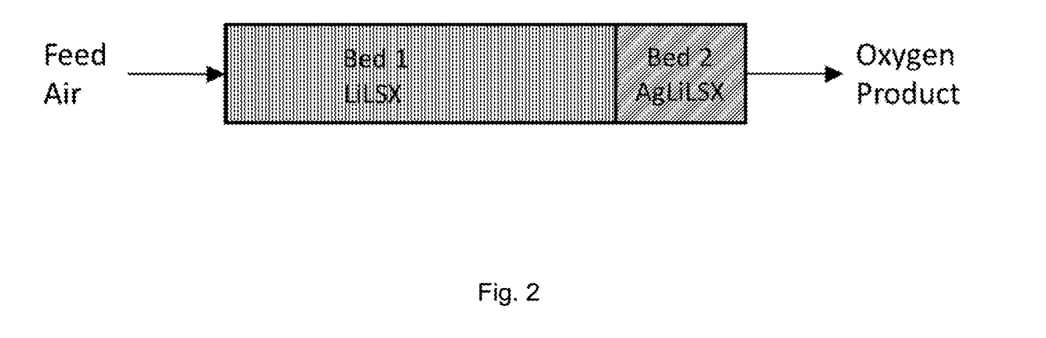
FIG. 2. Two-bed configuration for the oxygen generator during adsorption.
Figure 3:
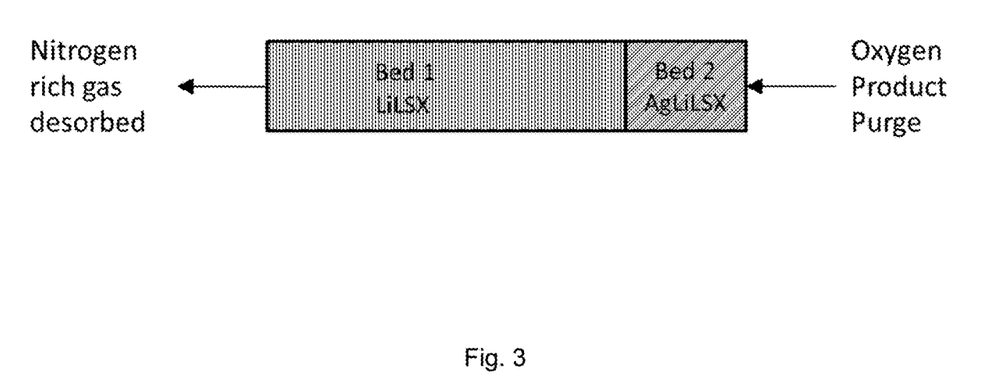
FIG. 3. Two-bed configuration for the oxygen generator during desorption/regeneration.
Figure 4:
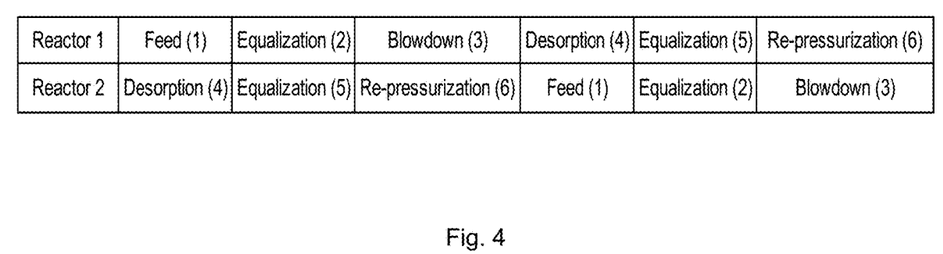
FIG. 4. Reactor operation sequence.

FIG. 2 and FIG. 3 show the layout of the layered beds of LiLSX and Ag-LiLSX during adsorption and desorption (purge) steps, respectively. FIG. 4 shows the typical two bed vacuum assisted pressure swing adsorption cycle used.

The system has an optimal L/D (length/diameter) of less than 1.8 that reduces the pressure drop in the bed during desorption; this increases the amount of oxygen product produced for the same power input. The lower L/D also allows the adsorbed moisture to be desorbed in a cyclic manner and provide a longer life for the air separation sorbent.

Example 1

Figure 5:
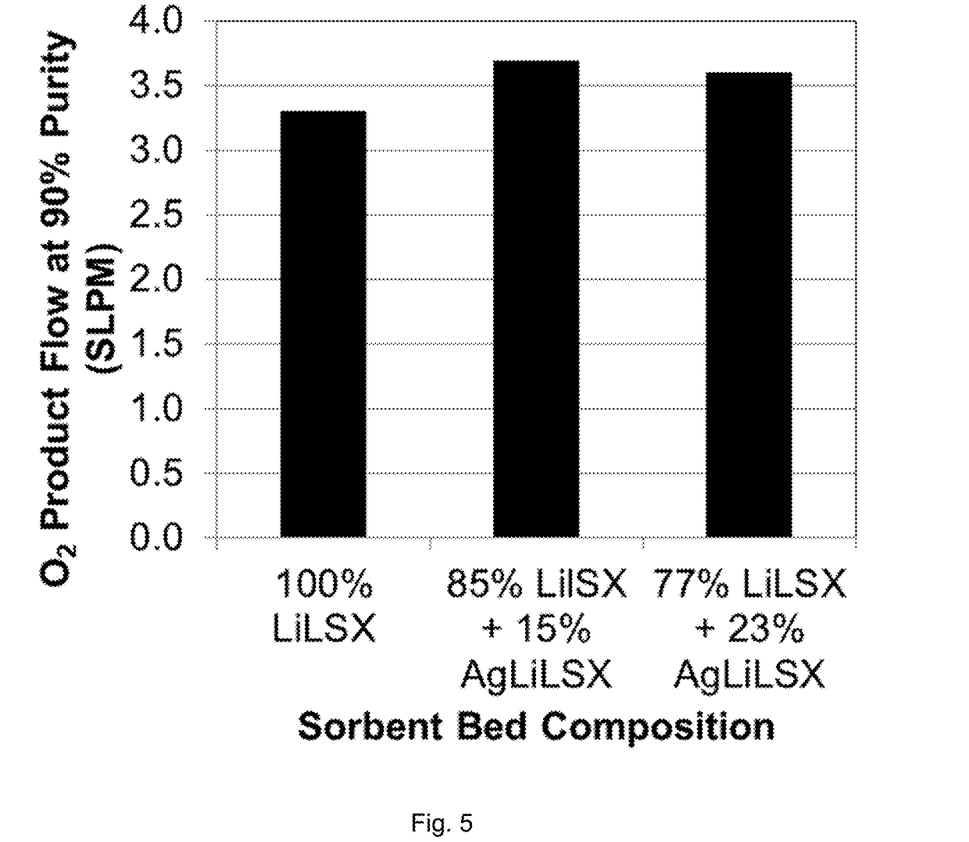
FIG. 5. Relative performance for single bed (LiLSX) vs. two bed (LiSFX and AgLiSFX) oxygen generators.

A comparative test was conducted (at same adsorption pressures and equalization times, bed size, etc.) with the bed completely filled with LiLSX zeolite and then with the bed split into two portions and the first portion filled with LiLSX (Bed 1) and the second portion filled with Ag-LiLSX (Bed 2) at the product end of the bed. For the split (layered) bed we used two ratios of LiLSX (Bed 1) to AgLiLSX (Bed 2). We used 85% USX (Bed 1) and 15% AgLiLSX (Bed 2) for the first ratio and 77% LiLSX (Bed 1) and 23% AgLiLSX (Bed 2) for the second ratio. At the product end of the bed, the nitrogen partial pressure is lowest, and the Ag-LiLSX has a greater capacity than LiLSX zeolite. The results of this test are shown in FIG. 5 and indicate that the by substituting a portion of the bed on the product end with Ag-LiLSX, the oxygen production rate increased from 3.3 SLPM up to 3.7 SLPM, a 10% increase. Since the total power consumption of the system remained the same, the normalized power consumption (specific energy for oxygen production (air separation) decreased by 10% as well.

Example 2

Figure 6:
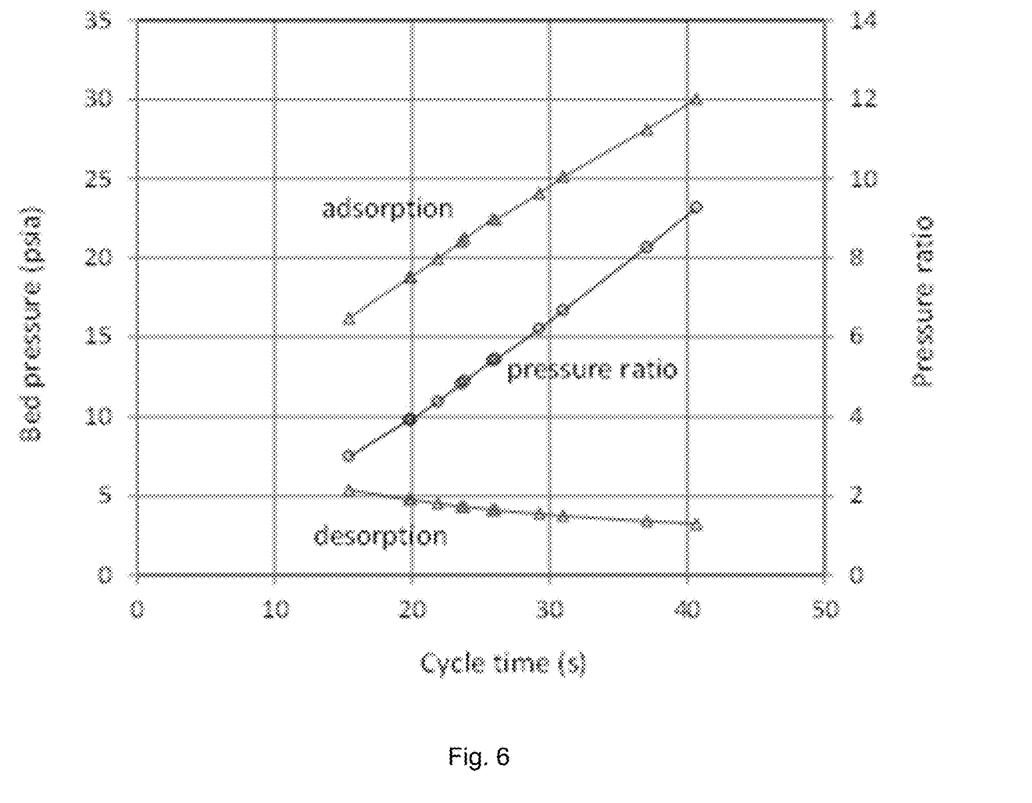
FIG. 6. Adsorption and desorption data for Example 2.

A two bed PSA system containing two 350 ml sorbent beds with each bed being two layers 77% LiLSX on the feed end followed by a second layer of 23% Ag-LiLSX. A vacuum pump was used to generate the adsorption and desorption pressures. In these tests, the cycle time was changed, and the backpressure regulator on the system was adjusted so that the maximum flow was achieved with a product purity of 90%. The effect of the cycle time on the adsorption and desorption pressures and the pressure ratio is shown in FIG. 6. The pressure ratio changed from 3 at a cycle time of 15 seconds to 9 at a cycle time of 40 seconds.

Figure 7:
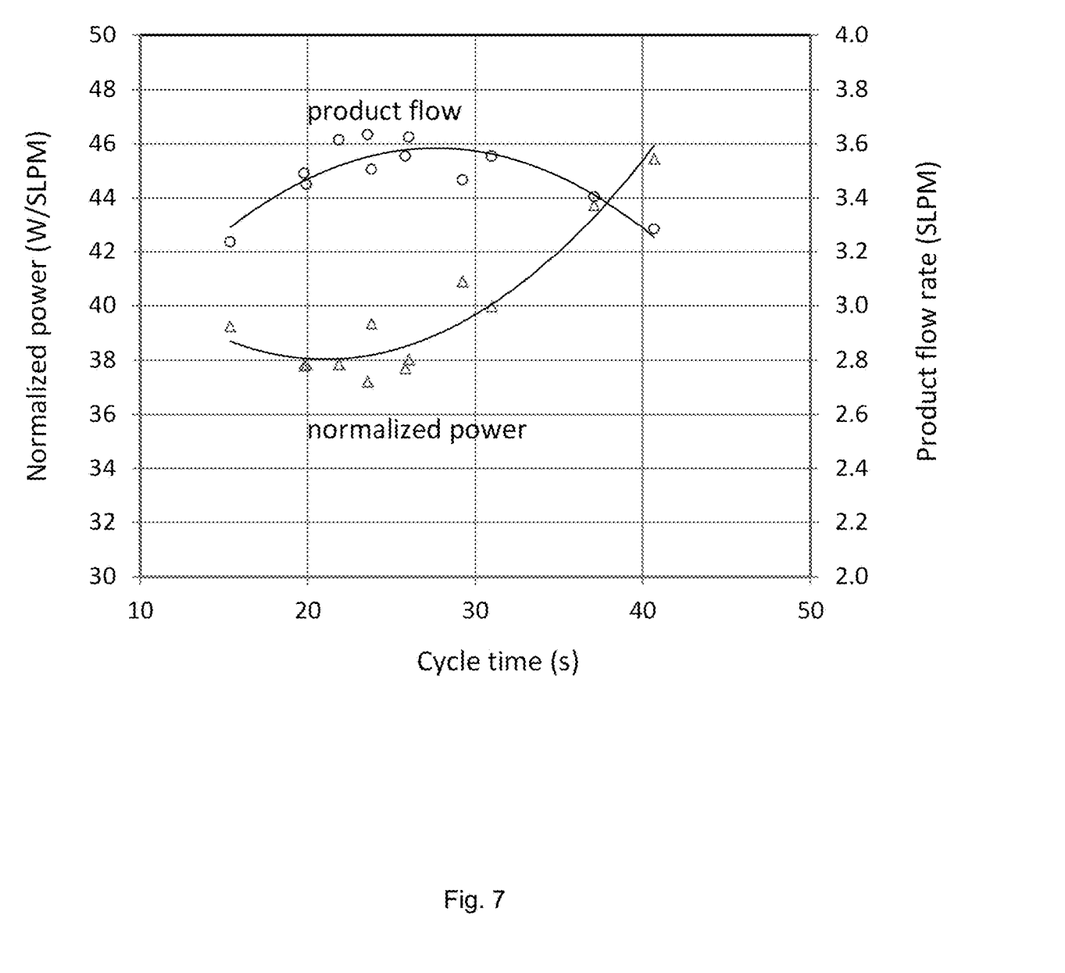
FIG. 7. Maximum product flow and normalized poser consumption data for Example 2.

The effect of the cycle time on the maximum product flow and on the normalized power consumption is shown in FIG. 7. From this figure alone it appears that the optimum operational point is with a cycle time of about 23 seconds, which corresponds to a peak adsorption pressure of 21 psia and a pressure ratio of about 5 because at this point the flow rate is the highest and the normalized power is the lowest. It may be desirable, however to operate the adsorption at a higher pressure to reduce the compression cost downstream of the concentrator module, or to provide sufficient pressure to flow the oxygen product through the flow meter and flow control valve. For this reason, the overall optimum cycle time to operate the air separation system is closer to 30 seconds which corresponds to an adsorption pressure of 25 psia and pressure ratio of 6.5.

Example 3

Figure 8:
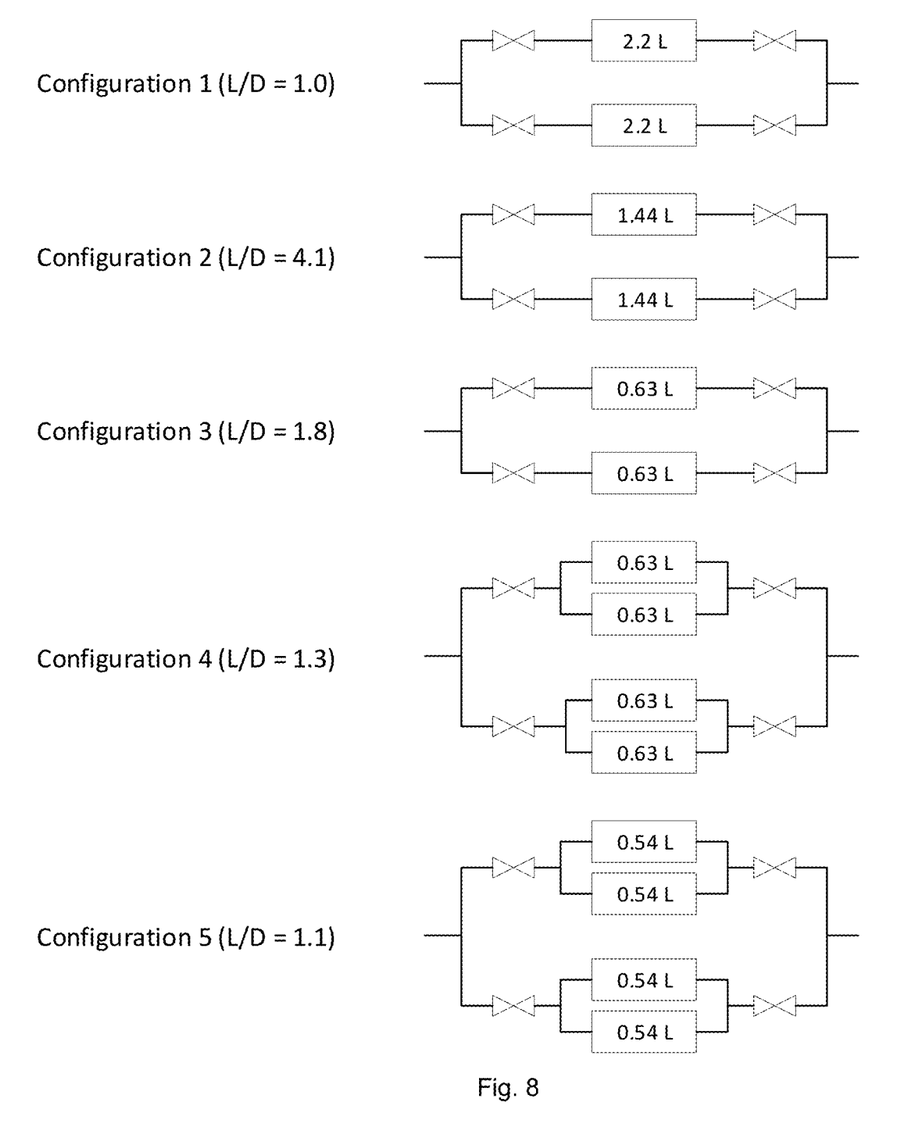
FIG. 8. Adsorption bed configurations for the examples.

Tests were carried out with sorbent beds filled with LiLSX sorbent with different reactor configurations (L/D) as illustrated in FIG. 8 while maintaining a steady oxygen product purity of 90%. We tested five reactor configurations 1) two 2.2 L beds with L/D=1.0, 2) two 1.44 L beds with L/D=4.1, 3) two 0.63 L beds with L/D=1.8, 4) four 0.63 L beds with two each in parallel with L/D=1.3, and 5) four 0.54 L beds with two each in parallel with L/D=1.1.

Figure 9:
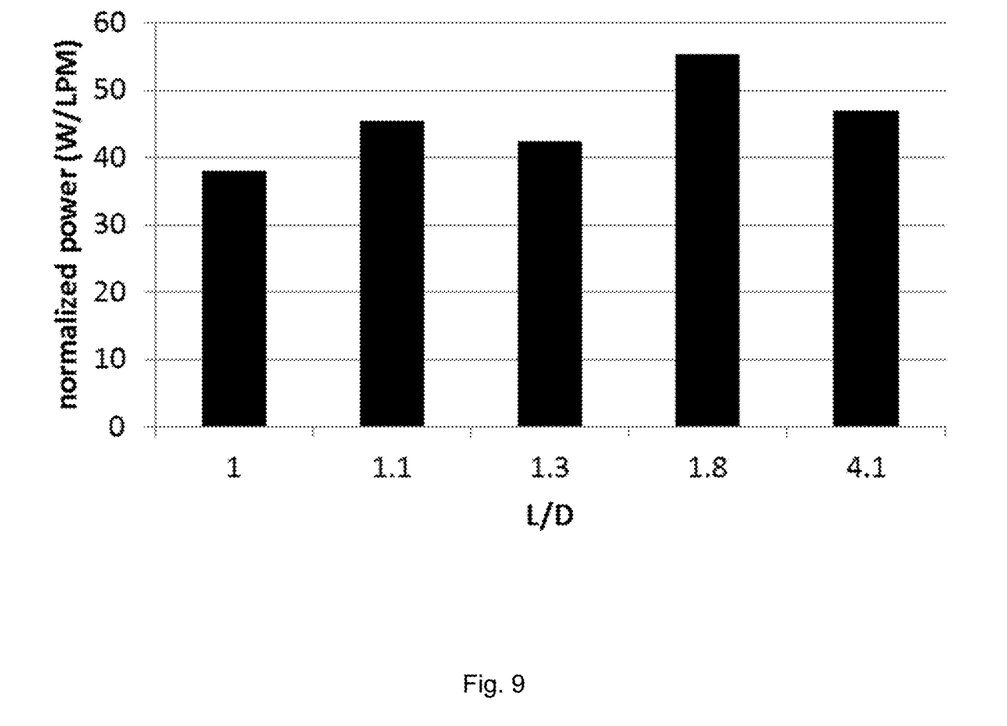
FIG. 9. Power draw at different L/D ration for Example 3.

FIG. 9 summarizes the normalized power draw at different L/D while producing the 90% purity oxygen product at their maximum flow. We see that a L/D lower than 1.8 produced 90% oxygen flow with lower power draw and the reactor configuration with L/D of 1.0 produced 90% oxygen with the lowest power draw.

Example 4

Tests were carried out with sorbent beds filled with LiLSX sorbent with different reactor configurations (L/D) while varying the purity of the oxygen produced. We tested two reactor configurations: configuration (2) illustrated in FIG. 8 two 1.44 L beds with L/D=4.1, and configuration (4) illustrated in FIG. 8 four 0.63 L beds with two each in parallel with L/D=1.3.

Figure 10:
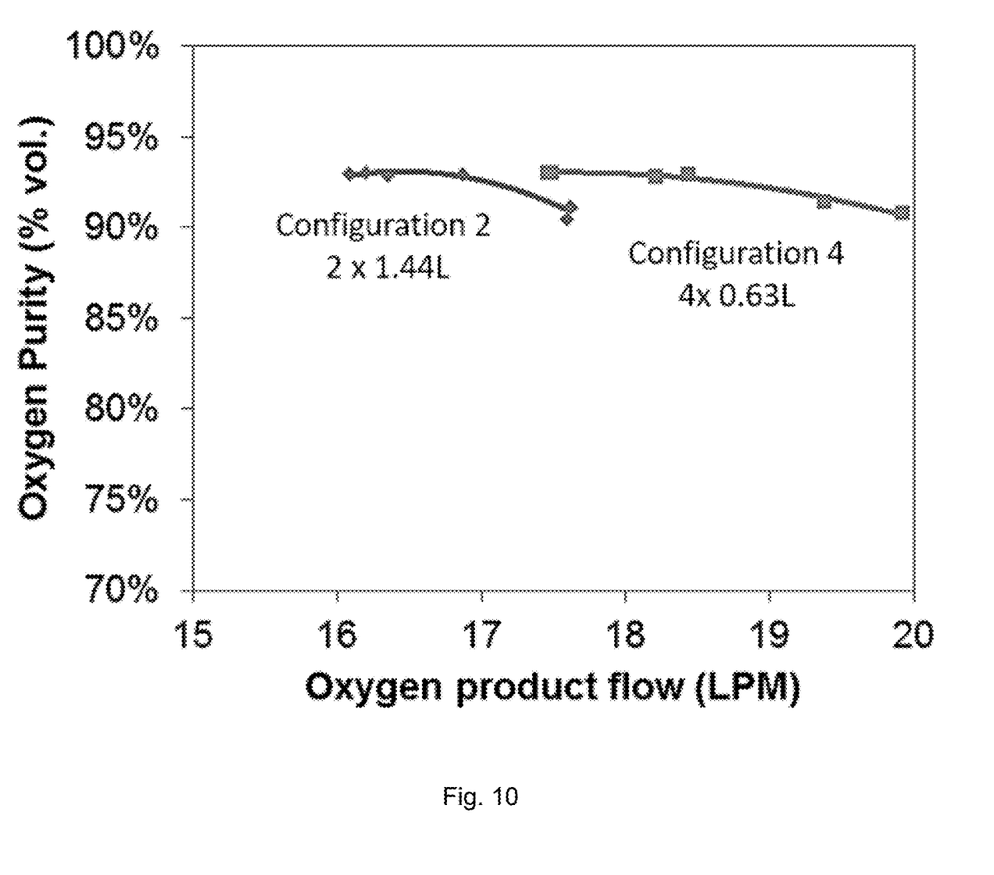
FIG. 10. Comparison of the regular two bed configuration with L/D=4.1 and the 4-bed with two beds in parallel configuration with L/D=1.3 at different oxygen product purity.

FIG. 10 shows the comparison of the regular two bed configuration with L/D=4.1 and the 4-bed with two beds in parallel configuration with L/D=1.3 at different oxygen product purity. The configuration (4) which uses two beds in parallel configuration produced 20 LPM of oxygen product flow (at a purity of 90+%).

Example 5

Tests were carried out with two 2.2 L sorbent beds (configuration (1) illustrated in FIG. 8) with L/D=1.0 filled with LiLSX zeolite while maintaining a steady oxygen product purity of 90% and a flow of 20 LPM. The beds were exposed to 24-hour humidity cycles from +26° C. to +35° C. (98+% RH) for a total duration of 6 days.

Figure 11:
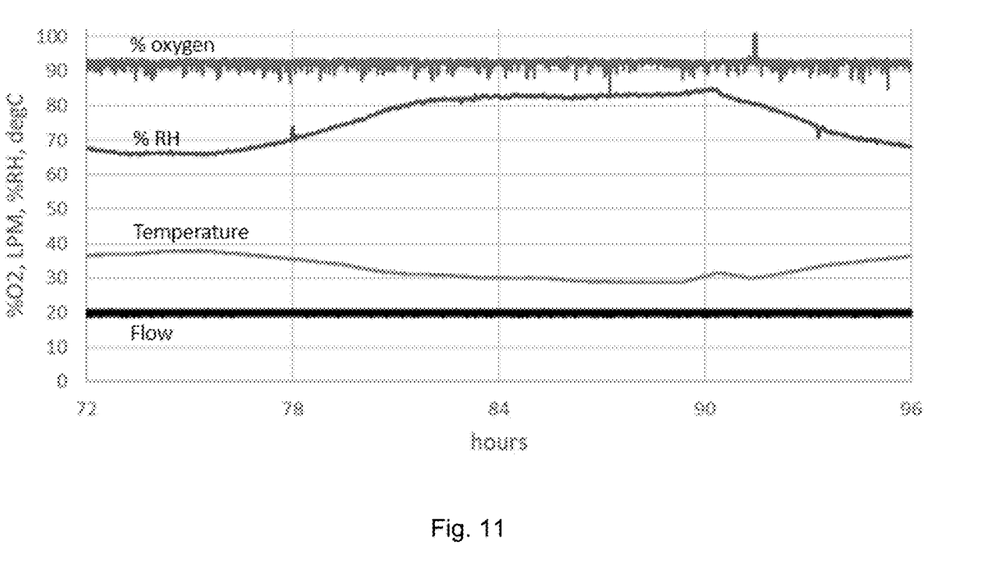
FIG. 11. Temperature, humidity and operating conditions for a typical 24-hour cycle.

FIG. 11 shows the temperature, humidity and operating conditions for a typical 24-hour cycle during the test. The oxygen calibration gas was used for verification at hour 91.5 and the peak can clearly be seen. The sorbent beds with L/D of 1.0 maintained its performance through 6 days.

Example 6

Tests were carried out with sorbent beds filled with a volume ratio of 85% LiLSX (Bed 1) and 15% AgLiLSX (Bed 2) at different bed depth using the same total sorbent bed volume of 242 mL and quantified the maximum flow of oxygen product produced with an average oxygen purity of 90% by volume.

Figure 12:
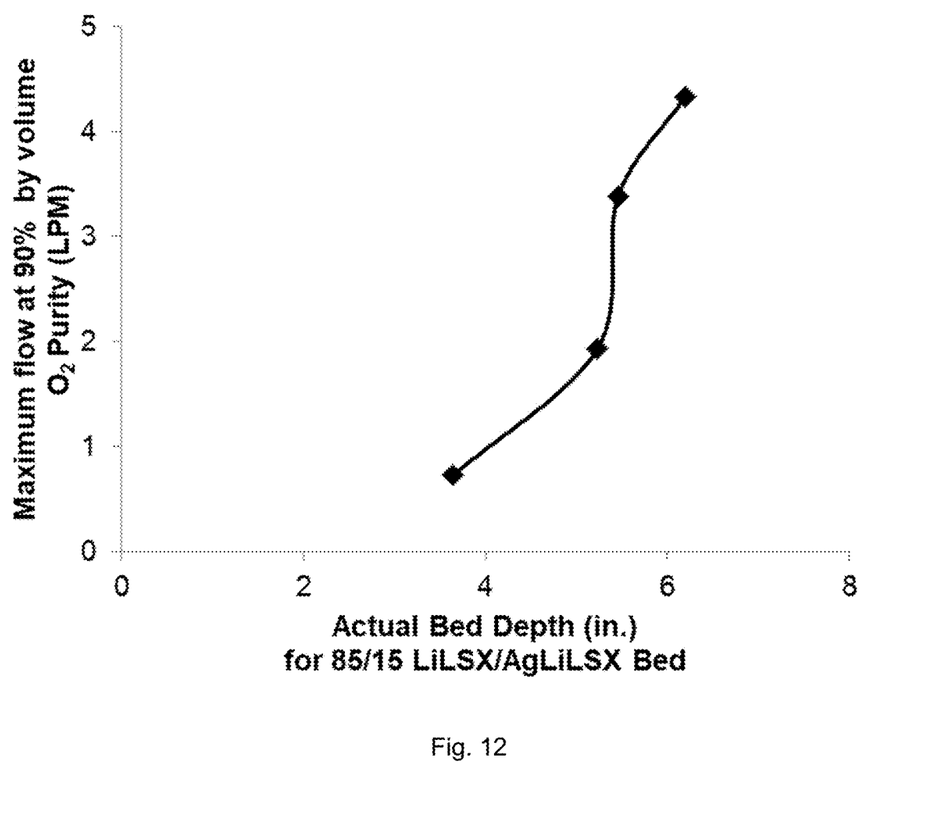
FIG. 12. Results for example 6.

FIG. 12 shows the maximum flow of oxygen product produced with an average oxygen purity of 90% by volume as a function of actual bed depth in inches. We see that at a bed depth of 5.5" the amount of oxygen product produced at 90% purity increase sharply to 3.5 LPM while a bed depth of 3.6" only produced 1.1 LPM of oxygen product at 90% purity. This shows that there is a minimum bed depth that is needed to maximize the performance and this is above 4", more specifically above 5.2".

What is claimed is:

1. A vacuum assisted pressure swing adsorption device for purifying oxygen from air, comprising:
    a first adsorption bed and a second adsorption bed, wherein the first adsorption bed and the second adsorption bed are either separate layers contained in the same adsorption bed vessel, or separate adsorption beds contained in separate adsorption bed vessels that are operably connected to each other in series;
    wherein, the first bed is located on the proximal end of an adsorption bed train and is operably connected to an air gas feed stream, the second bed is located on the distal end of an adsorption bed train and is operably connected to a purified oxygen exit gas stream; and
    wherein, the first bed comprises a LiLSX sorbent and a second bed comprises a AgLiLSX sorbent, wherein the first bed and the second bed are connected to each other in series and the AgLiLSX bed is located at the distal end of the adsorption bed.

2. The device of claim 1: wherein, the second bed is less than 50% of the total bed volume.

3. The device of claim 2: wherein, the second bed is less than 30% of the total bed volume.

4. The device of claim 3: wherein the bed length to diameter ratio is no more than 1.8.

5. The device of claim 4: wherein the bed length to diameter ratio is no more than 1.3.

6. A method for concentration oxygen for medical purposes using the device of claim 1, comprising: operating the device of claim 1 in a vacuum-assisted pressure swing adsorption process; and, producing a concentrated gas stream comprising 50-95% oxygen.

* * * * *